United States Patent
Hari et al.

(10) Patent No.: US 10,748,030 B2
(45) Date of Patent: Aug. 18, 2020

(54) SYSTEM AND METHOD FOR OBJECT RECOGNITION BASED ESTIMATION OF PLANOGRAM COMPLIANCE

(71) Applicant: Tata Consultancy Services Limited, Mumbai (IN)

(72) Inventors: Pranoy Hari, Chennai (IN); Shilpa Yadukumar Rao, Chennai (IN); Rajashree Ramakrishnan, Chennai (IN); Avishek Kumar Shaw, Chennai (IN); Archan Ray, Kolkata (IN); Nishant Kumar, Kolkata (IN); Dipti Prasad Mukherjee, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 16/307,409

(22) PCT Filed: Oct. 12, 2017

(86) PCT No.: PCT/IB2017/056318
§ 371 (c)(1),
(2) Date: Dec. 5, 2018

(87) PCT Pub. No.: WO2018/069861
PCT Pub. Date: Apr. 19, 2018

(65) Prior Publication Data
US 2019/0347508 A1 Nov. 14, 2019

(30) Foreign Application Priority Data
Oct. 12, 2016 (IN) .............................. 201621034860

(51) Int. Cl.
*G06K 9/00* (2006.01)
*G06K 9/62* (2006.01)
(Continued)

(52) U.S. Cl.
CPC ............. *G06K 9/6201* (2013.01); *G06K 9/42* (2013.01); *G06K 9/4604* (2013.01)

(58) Field of Classification Search
None
See application file for complete search history.

(56) References Cited

U.S. PATENT DOCUMENTS

| 7,949,568 B2 | 5/2011 | Fano et al. |
| 8,009,864 B2 | 8/2011 | Linaker et al. |

(Continued)

FOREIGN PATENT DOCUMENTS

WO WO-2016/051185 4/2016

OTHER PUBLICATIONS

International Search Report dated Feb. 22, 2018, in International Application No. PCT/IB2017/056318; 2 pages.
(Continued)

*Primary Examiner* — Shervin K Nakhjavan
(74) *Attorney, Agent, or Firm* — Finnegan, Henderson, Farabow, Garrett & Dunner LLP

(57) ABSTRACT

Object recognition based estimation of planogram compliance provides an expected arrangement of products in shelves. Identifying whether a product is placed in an appropriate location of a shelf is a challenging task due to various real-time parameters associated with image capturing. In the present disclosure, an input image associated with shelf of a retail store is received and a product images are cropped. Further, a set of reference images stored in a database are scaled corresponding to the input image. Further, one or more composite matching scores are calculated based on normalized cross-correlation and shape based feature matching to obtain one or more probable product images associated with a location. Further, a Directed Acyclic Graph (DAG) is constructed based on the one or more
(Continued)

composite scores and the one or more probable products. Finally, an optimal matching product image for a particular location is obtained from the DAG.

15 Claims, 9 Drawing Sheets

(51) Int. Cl.
*G06K 9/42* (2006.01)
*G06K 9/46* (2006.01)

(56) References Cited

U.S. PATENT DOCUMENTS

| | | | |
|---|---|---|---|
| 10,339,656 B1* | 7/2019 | Le | G06T 7/0042 |
| 10,592,742 B1* | 3/2020 | Hua | G06K 9/6215 |
| 2011/0050396 A1 | 3/2011 | Chaves | |
| 2013/0051667 A1* | 2/2013 | Deng | G06K 9/6203 |
| | | | 382/168 |
| 2013/0223673 A1* | 8/2013 | Davis | G06Q 30/00 |
| | | | 382/100 |
| 2014/0003729 A1 | 1/2014 | Auclair et al. | |
| 2014/0129395 A1* | 5/2014 | Groenovelt | G06Q 10/087 |
| | | | 705/28 |
| 2015/0052027 A1 | 2/2015 | Pavani et al. | |
| 2015/0310601 A1 | 10/2015 | Rodriguez et al. | |
| 2016/0027091 A1 | 1/2016 | McGrath | |
| 2016/0148147 A1* | 5/2016 | Gupta | G06Q 30/0254 |
| | | | 705/7.15 |
| 2016/0171707 A1* | 6/2016 | Schwartz | G06K 9/342 |
| | | | 382/180 |
| 2016/0180549 A1 | 6/2016 | Shekar et al. | |
| 2016/0260055 A1 | 9/2016 | High et al. | |
| 2017/0178310 A1* | 6/2017 | Gormish | G06K 9/6267 |
| 2017/0337508 A1* | 11/2017 | Bogolea | G06K 9/00771 |
| 2018/0005035 A1* | 1/2018 | Bogolea | G06K 9/00671 |
| 2020/0111053 A1* | 4/2020 | Bogolea | G06K 9/00664 |

OTHER PUBLICATIONS

Written Opinion dated Feb. 22, 2018, in International Application No. PCT/IB2017/056318; 4 pages.

* cited by examiner

SYSTEM AND METHOD FOR OBJECT RECOGNITION BASED ESTIMATION OF PLANOGRAM COMPLIANCE

CROSS-REFERENCE TO RELATED PATENT APPLICATIONS

The present application is a national phase under 35 U.S.C. § 371 of International Application No. PCT/IB2017/056318, filed Oct. 12, 2017, which claims priority to Indian Application No. 201621034860, filed in India on Oct. 12, 2016, both of which are hereby incorporated by reference in their entireties.

TECHNICAL FIELD

The embodiments herein generally relates, in general, to planogram compliance and, in particular, to a system and method for object recognition based estimation of planogram compliance.

BACKGROUND

Planogram is a plan for displaying products in a retail store. The retail store may have a number of shelves for storing the products and the planogram provides a best arrangement of products for a user. The best arrangement of the products can be based on needs of the user and for maximizing sales of a retailer. Further, a planogram based arrangement of products is used for justifying a space allocated to the brands and helping new product development. The planograms are designed at the retail headquarters and implementation of the planogram in the retail store may be deviated from the designed plan. Hence, planogram compliance is important factor for achieving desired results at the retail store.

The conventional methods for object recognition based planogram compliance are generally based on manual detection. The manual detection is extremely time consuming and error prone. Some existing method attempt to automate planogram compliance process using image matching mechanisms, wherein object recognition based estimation of planogram compliance is implemented. However, additional factors such as frequently changing product package, varying store illumination conditions, exponential increase in number of products and irregularities in the product shape pose challenges for imaging matching based planogram compliance.

SUMMARY

Embodiments of the present disclosure present technological improvements as solutions to one or more of the above-mentioned technical problems recognized by the inventors in conventional systems. For example, in one embodiment, a method for object recognition based estimation of planogram compliance is provided. The method includes receiving, an image ($I_s$) including a set of rows and a set of columns, associated with a shelf, by the one or more hardware processors. Further, the method includes generating, a set of scaled reference images ($I'_p$), by converting pixel dimension of a set of reference images ($I_p$) to the scale of the image ($I_s$), by the one or more hardware processors. Furthermore, the method includes preprocessing the image ($I_s$), to determine a set of rescaled product images ($I'_d$) corresponding to the set of scaled reference images ($I'_p$), by the one or more hardware processors. Furthermore, the method includes generating, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$) by the one or more hardware processors. Furthermore, the method includes calculating, one or more composite scores ($C_s$) for the one or more probable product images based on a set of optimized cross-correlation scores and a set of matching scores, by the one or more hardware processors. Furthermore, the method includes constructing, a Directed Acyclic Graph (DAG) based on the one or more Composite score ($C_s$) and the one or more probable product images, by the one or more hardware processors. Furthermore, the method includes identifying, a matching product image for the planogram compliance from the one or more probable product images in each column, based on the DAG, by the one or more hardware processors.

In another aspect, a system for object recognition based estimation of planogram compliance is provided. The system includes one or more memories comprising programmed instructions and a repository for storing the set of reference images ($I_p$) and the set of scaled reference images ($I'_p$), one or more hardware processors operatively coupled to the one or more memories, wherein the one or more hardware processors are capable of executing the programmed instructions stored in the one or more memories, an image capturing device and an image analysis unit, wherein the image analysis unit is configured to receive, an image ($I_s$) including a set of rows and a set of columns, associated with a shelf. Further, image analysis unit is configured to generate, a set of scaled reference images ($I'_p$), by converting pixel dimension of a set of reference images ($I_p$) to the scale of the image ($I_s$). Furthermore the image analysis unit is configured to preprocess the image ($I_s$), to determine a set of rescaled product images ($I'_d$) corresponding to the set of scaled reference images ($I'_p$). Furthermore, the image analysis unit is configured to generate, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$). Furthermore, the image analysis unit is configured to calculate, one or more composite scores ($C_s$) for the one or more probable product images based on a set of optimized cross-correlation scores and a set of matching scores. Furthermore, the image analysis unit is configured to construct, a Directed Acyclic Graph (DAG) based on the one or more Composite score ($C_s$) and the one or more probable product images. Finally, the image analysis unit is configured to identify, a matching product image for the planogram compliance from the one or more probable product images in each column, based on the DAG.

In yet another aspect, a computer program product comprising a non-transitory computer-readable medium having embodied therein a computer program for system and method for object recognition based estimation of planogram compliance, is provided. The computer readable program, when executed on a computing device, causes the computing device to receive, an image ($I_s$) including a set of rows and a set of columns, associated with a shelf. Further, the computer readable program, when executed on a computing device, causes the computing device to generate, a set of scaled reference images ($I'_p$) by converting pixel dimension of a set of reference images ($I'_p$) to the scale of the image ($I_s$). Furthermore, the computer readable program, when executed on a computing device, causes the computing device to preprocess the image ($I_s$), to determine a set of rescaled product images ($I'_d$) corresponding to the set of scaled reference images ($I'_p$). Furthermore, the computer readable program, when executed on a computing device, causes the computing device to generate, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$). Furthermore, the computer readable program, when executed on a computing device, causes the computing device to calculate, one or more composite scores ($C_s$) for the one or more probable product images based on a set of optimized cross-correlation scores and a set of matching scores. Furthermore, the computer readable program, when executed on a computing device, causes the computing device to construct, a Directed Acyclic Graph (DAG) based on the one or more Composite score ($C_s$) and the one or more probable product images. Furthermore, the computer readable program, when executed on a computing device, causes the computing device to identify, a matching product image for the planogram compliance from the one or more probable product images in each column, based on the DAG.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
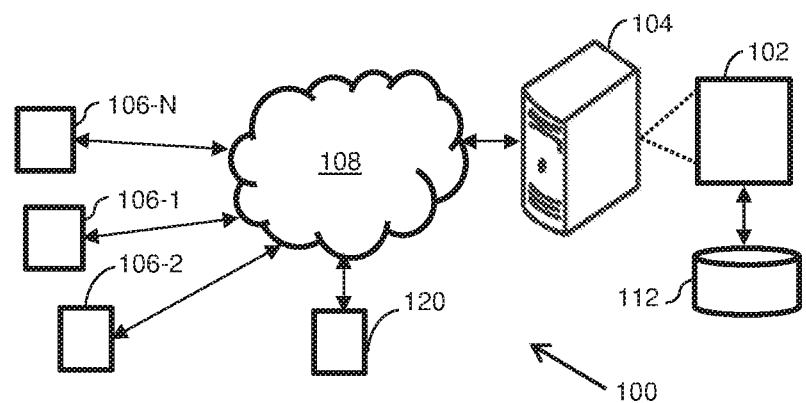
FIG. 1 illustrates a network environment implementing a system and method for object recognition based estimation of planogram compliance, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the field of object recognition based estimation of planogram compliance, image matching to identify an optimal matching product plays a vital role. Since the conventional methods are performing image matching manually and by utilizing basic image matching techniques, the object recognition based estimation of planogram compliance system is prone to a plurality of challenges including time consumption during manual matching, error in matching, frequently changing product package, varying store illumination conditions, exponentially increase in number of products and irregularities in the product shape.

The present subject matter overcomes the limitations of the conventional planogram checking methods by calculating a composite score based matching technique to obtain a set of probable products associated with a particular location. The composite matching score is based on normalized cross-correlation scores and feature based matching scores. Further, a Directed Acyclic Graph (DAG) is constructed based on the set of probable products and an optimal matching product is obtained by calculating a maximum weighted path in the DAG. An implementation of the system and method for object recognition based estimation of planogram compliance is described further in detail with reference to FIGS. 1 through 9C.

Referring now to the drawings, and more particularly to FIGS. 1 through 9C, where similar reference characters denote corresponding features consistently throughout the figures, there are shown preferred embodiments and these embodiments are described in the context of the following exemplary system and/or method.

FIG. 1 illustrates a network environment 100 implementing a system 102 for object recognition based estimation of planogram compliance, according to an example embodiment of the present subject matter. The system for object recognition based estimation of planogram compliance 102, hereinafter referred to as the system 102, is configured for receiving an image associated with a retail store using an image capturing device 120. In an embodiment, the image capturing device 120 can be an image capturing camera. In another embodiment, the image capturing device 120 can be a video capturing camera including a Closed Circuit Television (CCTV) camera. The system 102 may be embodied in a computing device, for instance a computing device 104.

Although the present disclosure is explained considering that the system 102 is implemented on a server, it may be understood that the system 102 may also be implemented in a variety of computing systems, such as a laptop computer, a desktop computer, a notebook, a workstation, a cloud-based computing environment and the like. In one implementation, the system 102 may be implemented in a cloud-based environment. It will be understood that the system 102 may be accessed by multiple users through one or more user devices 106-1, 106-2 . . . 106-N, collectively referred to as user devices 106 hereinafter, or applications residing on the user devices 106. Examples of the user devices 106 may include, but are not limited to, a portable computer, a personal digital assistant, a handheld device, a Smartphone, a Tablet Computer, a workstation and the like. The user devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. The components and functionalities of the system 102 are described further in detail with reference to FIG. 2.

Figure 2:
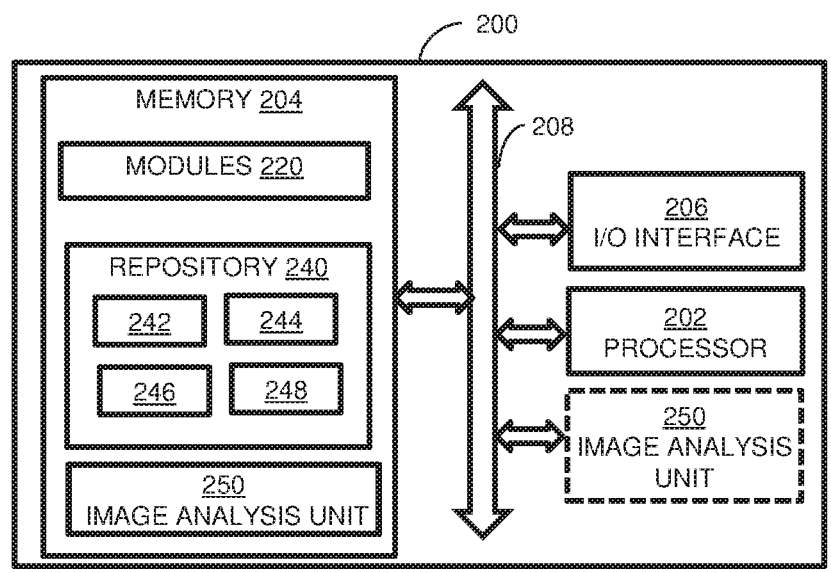
FIG. 2 illustrates a block diagram of the system for object recognition based estimation of planogram compliance, according to some embodiments of the present disclosure.

FIG. 2 illustrates a block diagram of the system for object recognition based estimation of planogram compliance, according to some embodiments of the present disclosure. The object recognition based estimation of planogram compliance system 200 (hereinafter referred to as system 200) may be an example of the system 102 (FIG. 1). In an example embodiment, the system 200 may be embodied in, or is in direct communication with the system, for example the system 102 (FIG. 1). The system 200 includes or is otherwise in communication with one or more hardware processors such as a processor 202, at least one memory such as a memory 204, an I/O interface 206 and an image analysis unit 250. In an embodiment, the image analysis unit 250 can be implemented as a standalone unit in the system 200 comprising a composite score calculation module (not shown in FIG. 2), a graph construction module (not shown in FIG. 2), and a matching product identification module (not shown in FIG. 2). In another embodiment, the image analysis unit 250 can be implemented as a module in the memory 204 comprising the composite score calculation module (not shown in FIG. 2), the graph construction module (not shown in FIG. 2), and the matching product identification module (not shown in FIG. 2). The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220 and the image analysis unit 250. The modules 220 may include routines, programs, objects, components, data structures, and so on, which perform particular tasks or implement particular abstract data types.

The memory 204 also includes module(s) 220 and a data repository 240. The module(s) 220 include programs or coded instructions that supplement applications or functions performed by the object recognition based estimation of planogram compliance system 200. The modules 220, amongst other things, can include routines, programs, objects, components, and data structures, which perform particular tasks or implement particular abstract data types. The modules 220 may also be used as, signal processor(s), state machine(s), logic circuitries, and/or any other device or component that manipulates signals based on operational instructions. Further, the modules 220 can be used by hardware, by computer-readable instructions executed by a processing unit, or by a combination thereof. The modules 220 can include various sub-modules (not shown). The modules 220 may include computer-readable instructions that supplement applications or functions performed by the object recognition based estimation of planogram compliance system 200.

Figure 3A:
FIG. 3A depicts some example images ($I_p$), stored in the product image database, according to some embodiments of the present disclosure.

The data repository 240 may include received input images 242, a product image database 244, a scaled images database 246 and other data 248. Further, the other data 248 amongst other things, may serve as a repository for storing data that is processed, received, or generated as a result of the execution of one or more modules in the module(s) 220 and the modules associated with the image analysis unit 250. The repository 240 is further configured to maintain a plurality of parameters and prior information associated with the images stored in the data repository 240. In an embodiment, the product image database 244 may include a set of product images $I_p$, where p=1, 2, . . . N. FIG. 3A depicts certain example images $I_p$, stored in the product image database, according to some embodiments of the present disclosure. Here, the product images could be captured by utilizing any image capturing device 120.

Although the data repository 240 is shown internal to the object recognition based estimation of planogram compliance system 200, it will be noted that, in alternate embodiments, the data repository 240 can also be implemented external to the object recognition based estimation of planogram compliance system 200, where the data repository 240 may be stored within a database (not shown in FIG. 2) communicatively coupled to the object recognition based estimation of planogram compliance system 200. The data contained within such external database may be periodically updated. For example, new data may be added into the database (not shown in FIG. 2) and/or existing data may be modified and/or non-useful data may be deleted from the database (not shown in FIG. 2). In one example, the data may be stored in an external system, such as a Lightweight Directory Access Protocol (LDAP) directory and a Relational Database Management System (RDBMS). In another embodiment, the data stored in the data repository 240 may be distributed between the planogram compliance system 200 and the external database.

Figure 3B:
FIG. 3B depicts an example input image ($I_s$), according to some embodiments of the present disclosure.

The image analysis unit 250 of the planogram compliance system 200 can be configured to receive, an image ($I_s$) captured by the image capturing device 120. In an embodiment, the image ($I_s$) can be a shelf image of a retail store including a set of rows and a set of columns. The shelf image is associated with a shelf dimension including a height and a width. For example, the image ($I_s$) can include X number of rows and Y number of columns. Here, X indicates the height of the shelf image and Y indicates the width of the shelf image. FIG. 3B depicts an example image ($I_s$), according to some embodiments of the present disclosure. The example image ($I_s$) includes X rows rows and Y columns. Here, each column includes at least a part of a product image and the product image is associated with a pixel dimension.

Further, the image analysis unit 250 of the planogram compliance system 200 can be further configured to generate a set of scaled reference images ($I'_p$), corresponding to the image ($I_s$). Here, the pixel dimension of each image ($I_p$) among the set of product images stored in the product image database are converted to the pixel dimension of the input image ($I_s$) by maintaining an aspect ratio of the image ($I_p$) to obtain the set of rescaled reference images. The set of rescaled reference images are represented as $I'_p$.

Further, the image analysis unit 250 of the planogram compliance system 200 can be configured to determine a set of rescaled product images ($I'_d$) corresponding to the set of scaled reference images ($I'_p$) by preprocessing the image ($I_s$). Here, the preprocessing is performed because of three reasons: (i) thickness associated with the shelf of the image ($I_s$) is not known apriori (ii) the product stack is not perfectly aligned all the time and (iii) the shelves are not horizontal in the image. Here, for every column location i, where i=1, 2 . . . C of the image ($I_s$), a set of N×l×t rescaled product images ($I'_d$) can be obtained, where d=1, 2 . . . N×l×t. Here, N indicates number of product images cropped from the image $I_s$, l indicates number of scaling and t indicates number of shifting. Here, a product image can be available among the N×l×t rescaled product images ($I'_d$).

In an embodiment, a method of generating N number of cropped images from the image ($I_s$) is explained as follows: The image ($I_s$) includes C number of columns and each column is identified as a location i, where, i=1, 2 . . . C. Further, N number of images are cropped from the image ($I_s$) by cropping at least an image from each location i. Here, the dimension of each cropped image among the set of cropped images are scaled to the dimension of the set of scaled reference images ($I'_p$).

In an embodiment, a method of generating l number of scaled images from the image ($I_s$) is explained as follows: The scaling from $I_p$ to $I'_p$ may not guarantee exact resizing of the product image to the scale of the image ($I_s$), hence a rescaling is performed on the dimension of $I'_p$ by up scaling the set of scaled reference images ($I'_p$), l/2 times and down scaling the set of scaled reference images ($I'_p$), l/2 times to obtain a scaling of l times.

In an embodiment, location of a shelf may not exactly align with a bottom-most row of the image ($I_s$) due to position of the image capturing device with respect to the location of the shelf. Here, a shifting is performed by up shifting the set of product images ($I_d$) associated with each row of the image ($I_s$), t/2 times and down shifting the set of product images ($I_d$) associated with each row of the image ($I_s$), t/2 times resulting a shifting of t times. Here, the shifting of t times indicates a number of shifts to be performed when cropping a set of product images to obtain the set of rescaled product images ($I'_d$). In an embodiment, only upshifting is performed for a row at the bottom of the image ($I_s$), the and only downshifting is performed for a row at the top of the image ($I_s$).

Further the image analysis unit 250 of the planogram compliance system 200 can be configured to generate one or more probable product images for each column from the set of columns corresponding to every row of the image ($I_s$) by a comparison between every rescaled product image from the set of rescaled product images ($I'_d$) and every scaled reference images from the set of scaled reference images ($I'_p$). Here, the Red Green Blue (RGB) color images including the set of rescaled product images ($I'_d$) and the set of scaled reference images ($I'_p$) are converted into "Lab" color space. In Lab color space, 'L' indicates lightness, 'a' and 'b' indicates color channels.

In an embodiment, a normalized cross-correlation between each rescaled product image from the set of rescaled product images ($I'_d$) and each scaled reference images from the set of scaled reference images ($I'_p$) is performed to obtain a set of normalized-cross correlation scores for each comparison. Further, the set of normalized cross-correlation scores corresponding to each rescaled product image from the N×l×t number of rescaled product images are added to obtain a set of summed cross-correlation scores. Further, a set of optimal cross-correlation scores are calculated by: (i) sorting the set of summed cross-correlation scores corresponding to each rescaled product image from the set of rescaled product images ($I'_d$) in descending order to obtain a list and (ii) selecting 'k' number of summed cross-correlation score from the beginning of the list. The number of summed cross-correlation scores represent 'k' possible products to be present at column i of the image ($I_s$), where, i=1, 2, . . . C.

Further the image analysis unit 250 of the planogram compliance system 200 can be configured to calculate one or more composite score ($C_s$) for the one or more probable product images. In an embodiment, the one or more composite scores ($C_s$) is obtained by combining a set of optimized cross-correlation score and a set of matching scores. Here the set of matching scores are obtained from Neo Speeded Up Robust Features (NSURF). In an embodiment, the set of matching scores can be a set of shape based features. The NSURF is a speeded up customized version of SURF. Here, the NSURF is utilized to complement the set of summed cross-correlation score with the set of shape based features. Further, in an embodiment, one or more features of the SURF can be rationalized to obtain speed in NSURF, for example, rotation invariance and large sized kernels of SURF are rationalized in the present disclosure. For example, the slant of an image on a shelf with respect to its upright position is minor and typically the slant may be ±15°. So the minor variations in slant may not affect the estimation of key points when SURF is used without the features for rotation invariance. Further, the performance of SURF can be less when applied to images of small sized products and while utilizing a kernel size varying from 9×9 to 99×99. In an embodiment, a kernel size of 51×51 can be used. Further, a filter size more than 51 can be unsatisfactory because of the size constraint of ($I'_p$) and ($I'_d$). Further, a division of a scale space into various overlapping octaves proposed by SURF can be reduced. In an embodiment, the present disclosure utilizes two octaves in NSURF.

In an embodiment, localization of key point in NSURF matching is explained as follows: A key point is a location in an image where the determinant of the Hessian matrix attains an extrema. The Hessian matrix is calculated using a response of the image to filters of second order partial derivatives of Gaussian along x, y and xy directions. A key point is a tuple determined by three parameters (x, y, σ). Here x and y denote the location of key point and σ denotes the scale of key point. The σ is represented by equation 1.

$$\sigma = (\text{current filter size}) * \frac{\text{base filter scale}}{\text{base filter size}} \quad (1)$$

Here, for example, a set of key points at various scales are obtained by utilizing two octaves. Each octave defines two Gaussian scale spaces. A first scale space of the first octave utilizes values as (1.2, 2, 2.8). The corresponding filter mask sizes are (9×9, 15×15, 21×21) respectively based on equation 1. The filter mask sizes for the second scale space of the first octave are (2, 2.8, 3.6) and (15×15, 21×21, 27×27). Here, the key point is a local maxima or minima of the 3×3×3 cuboid of the filtered version of the image in each scale space of each octave. The a values for two scale spaces of the second octave are (2, 3.6, 5.2) and (3.6, 5.2, 6.8) with corresponding mask sizes as (15×15, 27×27, 39×39) and (27×27, 39×39, 51×51) respectively. Here, an overlap is identified between scale spaces in both the octaves in order to cover the total range of Gaussian scaling by both the octaves. Here, each filter can find the key point close to its scale. However, the kernel responses near the periphery of the image need zero padding. Hence, any key point generated near the periphery of the image is discarded as an unreliable key point. For a filter of size d×d, due to zero-padding, all the key points obtained at a distance of d/2 from the boundary of the image are discarded to obtain an useful area of the filter response from where key points are extracted. Further, a set of matching scores are calculated between the one or more probable product images and the set of scaled reference images ($I'_p$) by utilizing the set of key points.

In an embodiment, the set of matching scores are calculated between the one or more probable product images and the set of scaled reference images ($I'_p$) by utilizing the set of key points as follows: After locating the key points, a square region of size 20σ×20σ is extracted centered on the location of the key point. The 20σ×20σ square is split into 16 smaller square regions each of size 5σ×5σ, centered around the key point. For each 5σ×5σ region, a set of Haar filter responses are evaluated to calculate a set of sum values including a sum of derivative along x and y and a sum of absolute values of derivative along x and y. Here, for each 5σ×5σ region, a set of scalar values are calculated. The set of scalar values are called as a set of feature vectors. Further, for the entire 20σ×20σ region around each key point, a total of 64-dimensional feature vectors are created. A filter of size 2σ are computed for 25 regularly spaced points in each 5σ×5σ sub-region to calculate a Haar wavelet. Further, the 64-dimensional feature vectors from ($I'_p$) and the one or more probable product images for a key point are matched to calculate the set of matching score.

For example, Let $K_i$ be the set of key points identified from the one or more probable product images where 1≤i≤k1 and $K'_j$ be the set of key points obtained from the $I'_p$, where 1≤j≤k2 respectively. Here, each $K_i$ or $K'_j$ is identified by 64 dimensional vector. Further a Euclidean distance θ is calculated between a Ki (for example, $K_p$) and a $K'_j$ (for example, $K'_q$). Here, the $K_p$ and $K'_q$ are identified as best matches. If the value of θ is lower, the better is the match between the key points. In the present disclosure, for a potential match between $K_p$ and $K'_q$, a conservative threshold is chosen and the value of the conservative threshold as θ≤0.04. Additionally, the ratio between a minimum distance θ and the second minimum distance of $K_p$ from all other $K'_j$ except $K'_q$ can be less than 0.4.

In an embodiment, Let $\theta = \theta_m$ between $K_p$ and $K'_q$. Here, if the distance of $K'_q$ from all other Ki except $K_p$ is more than $\theta_m$, the pair $K_p$ and $K'_q$ is identified as matching key points. The total number of the set of matching key points between the one or more probable image and $I'_p$, are the set of matching scores. Here, obtaining a reliable matching score depends on reliable calculation of the scale σ. For example, three different scale values for each scale space per octave are utilized to estimate a key point and the estimation of scale values are explained below.

In an embodiment, the estimation of scale is as explained as follows: A scale associated with a key point is located by utilizing equation 2. The scale associated with a key point is the extrema of scale space filtered image. Let f denotes the tuple (x, y, σ) for a key point. Following Taylor series expansion, the Laplacian L of scale space is given by, $$L(f) = L + \frac{\partial L^T}{\partial f} + \frac{1}{2} f^T \frac{\partial^2 L}{\partial f^2} f \qquad (2)$$

In order to find extrema, differentiating equation 2 and equating with zero provides equation 3, $$\hat{f} = -\left(\frac{\partial^2 L}{\partial f^2}\right)^{-1} \frac{\partial L}{\partial f} \qquad (3)$$

Where, a third element vector of $\hat{f}$ of equation 3 provides the scale value of σ.

In an embodiment, the one or more composite scores ($C_s$) are calculated for the one or more probable product images by utilizing the set of optimal cross-correlation scores and the set of matching scores as shown in equation 4. Here, for each $i^{th}$ column of the image $I_s$, where i=1, 2, . . . C, k number of products chosen to be present by the normalized cross-correlation matching and each of the k products is associated with the set of summed cross-correlation represented as $C_r$. The set of matching scores between each of the k selected images at $i^{th}$ column of image $I_s$, corresponding to the product image $I'_p$ is represented by U. Each score from the set of matching score is significantly higher than each value of the set of optimal cross-correlation score. Here, a composite score is chosen to magnify the discrimination between the one or more probable product images at $i^{th}$ location. The designed composite score $C_s$ is given by equation 4.

$$C_s = U^{C_r} \qquad (4)$$

The equation 4 can be used to discriminate similar types of products, for example, breakfast cereals or milk containers. Here, the similarity indicates a similarity in dimension but dissimilar in packaging available in one given shelf. Here, raising U to the power of $C_r$ can provide more discrimination. In an embodiment, the one or more composite score $C_s$ is calculated for the one or more probable product.

Figure 3C:
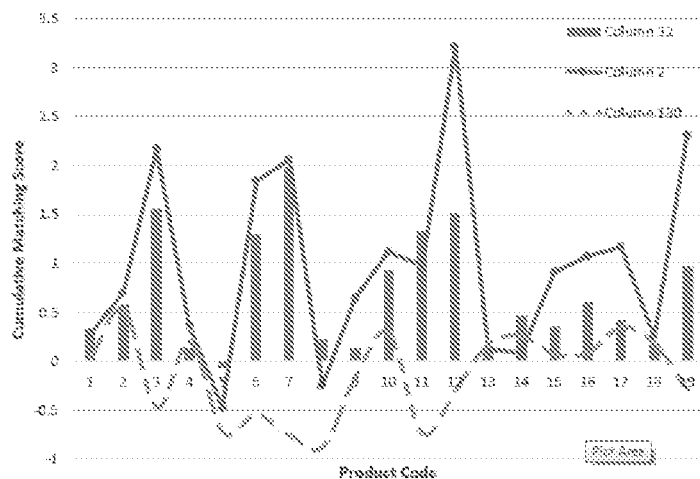
FIG. 3C depicts an example graph for a set of cross-correlation scores (cumulative matching scores) for a one or more probable product image associated with the corresponding columns of FIG. 3B.

In an embodiment, the value of 'k' is chosen as three and a test suit is designed with 19 product images to calculate the set of cross-correlation scores for identifying the one or more probable product images. The corresponding composite score ($C_s$) for 19 products including two products present in the shelf image shown in FIG. 3B is obtained. FIG. 3C depicts an example graph for the set of cross-correlation scores (cumulative matching score) for the one or more probable product image associated with the corresponding columns of FIG. 3B, according to some embodiments of the present disclosure. Now referring to FIG. 3C, the one or more probable products in column 2 based on the composite score ($C_s$) includes 12, 19 and 3. Similarly, for column 32, the one or more probable products includes 7, 3 and 12.

Further the image analysis unit 250 of the planogram compliance system 200 can be configured to construct the Directed Acyclic Graph (DAG) based on the one or more Composite score ($C_s$) and the one or more probable product images. In an embodiment, the number of probable product images for each column of the shelf can be k products images (for example, 3 product images). Here selecting a product images with highest composite score $C_s$ may result in a wrong product selection. Hence, the matching product is selected by constructing the DAG. The DAG includes a source node S, a sink node T and a set of nodes $n_i$. The set of nodes $n_i$ includes a plurality of nodes associated with each column of the image $I_s$. Here, each column is associated with k nodes (for example, three nodes) arranged vertically to represent the k probable product images associated with the corresponding column. Each probable product image is associated with a $C_s$ value. Hence the total number of probable nodes in the DAG is (k×C)+2. Further, a set of edges are constructed based on an edge matrix. Here, E is an edge matrix. A first set of directed edges are constructed between S and the set of nodes $n_i$. The first set of nodes are represented as E (S, $n_i$)=ε. A second set of edges are constructed between T and the set of nodes $n_i$ except the sink node T. The second set of nodes are represented as E ($n_i$, T)=ε. Here, no edges are constructed between the k nodes associated with each column. Further, a third set of edges are constructed as follows: A width of a product $l'_p(i)$ at any $i^{th}$ location of the image $I_s$, is denoted as width ($I'_p(i)$). There exists a directed edge $E(I'_p(i), I'_p(j))$, ∀j if and only if (j−i)≥width($I'_p(i)$). The edge weight for $E(I'_p(i), I'_p(j))=C_s(I'_p(i))$, where $C_s(I'_p(i))$ is the composite score of $I'_p(i)$.

Figure 4:
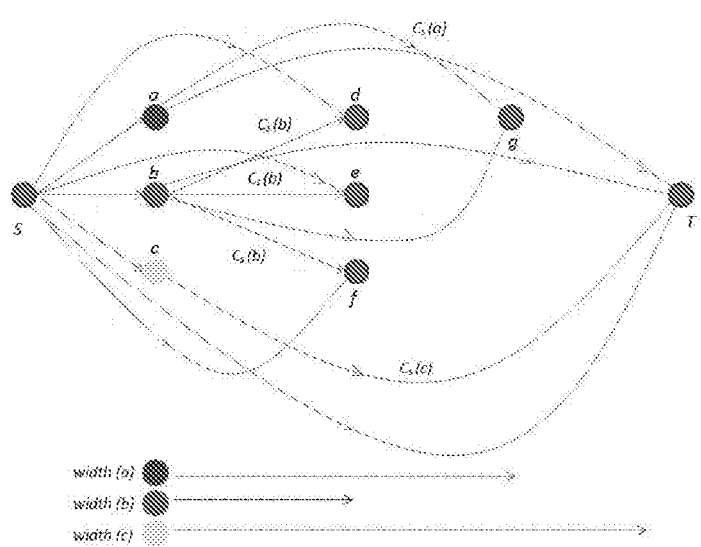
FIG. 4 depicts an example Directed Acyclic Graph (DAG) for identifying a matching product, according to some embodiments of the present disclosure.

FIG. 4 depicts an example DAG for identifying a matching product, according to some embodiments of the present disclosure. Now referring to FIG. 4, a plurality of dark circles represents the set of nodes $n_i$ including the source node S and the sink node T. The set of nodes $n_i$ includes a node a, a node b, a node c, a node d, a node e, a node f and a node g. Here, the node a, the node b and the node c represents the top k products (For example, k=3) associated with a first column of the shelf. The node d, the node e and the node f represents the top k products associated with a second column of the shelf. The node g represents the top k product associated with a third column of the shelf. Here, three black straight lines at the bottom of the FIG. 4 indicates the width of each product. Further a set of edges including the first set of edges, the second set of edges and the third set of edges are constructed.

Further, the image analysis unit 250 of the planogram compliance system 200 can be configured to identify a matching product image from the one or more probable product images in each column, based on the DAG. Here, a maximum weighted path in the DAG is obtained. Initially, a set of probable paths starting from the source node S and reaching to sink node T are generated. Further, the weights associated with each edge of each path from the set of probable paths are summed to form a set of path weights. A path corresponding to the maximum path weight is selected from the set of probable paths. Further, one or more final products images corresponding to one or more nodes associated with the maximum weighted path are identified as the matching product images.

In an embodiment, obtaining a maximum weighted path in any graph is an NP (Non-deterministic polynomial time) hard problem. However, one or more edge weights are negated and a minimum weighted path is obtained using Bellman-Ford algorithm. A node corresponding to a product chosen at $i^{th}$ column of the image $I_s$ can send a score at all locations next to i but not to any locations prior to i. The score is given by E $(I'_p(i), I'_p(j))=C_s(I'_p(i))$, where (j−i) ≥width $(I'_p(i))$. Here, for any pair of $I'_p$ and $I'_d$, if a matching score among the set of matching scores is 0, ε is assigned as matching score. Further, the minimum weighted path using Bellman-Ford algorithm considering feed forward edge weights provides the final arrangement of products on the shelf.

Figure 5:
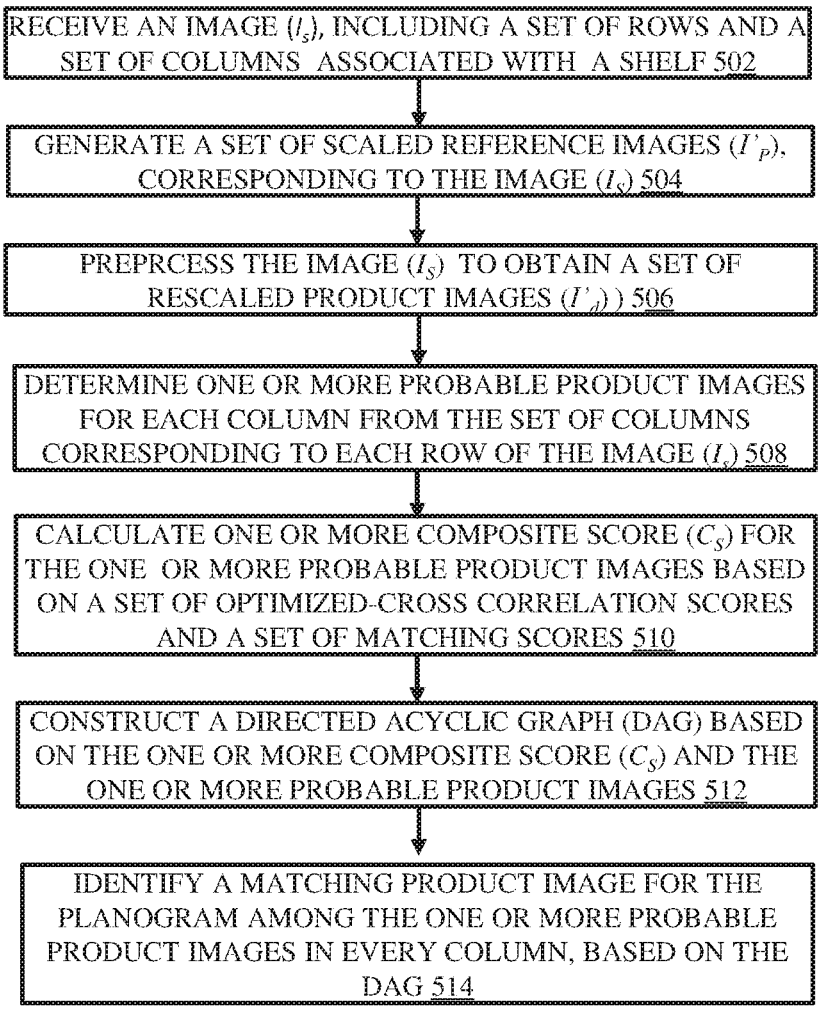
FIG. 5 illustrates a detailed flow diagram for object recognition based estimation of planogram compliance planogram compliance, according to some embodiments of the present disclosure.

FIG. 5 illustrates a flow diagram of a method 500 for the object recognition based estimation of planogram compliance, according to some embodiments of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof.

At 502, the system 200 receives, by the one or more hardware processors, the image $(I_s)$ including the set of rows and the set of columns, associated with the shelf. At 504, the system 200 generates, by the one or more hardware processors, the set of scaled reference images $(I'_p)$, by converting pixel dimension of the set of reference images $(I_p)$ to the scale of the image $(I_s)$. At 506, the system 200 preprocesses the image $(I_s)$, by the one or more hardware processors, to determine the set of rescaled product images $(I'_d)$ corresponding to the set of scaled reference images $(I'_p)$. Here, the set of product images $(I_d)$ are cropped from each column from the set of columns associated with each row of the image $(I_s)$. Further, the set of rescaled product images $(I'_d)$ corresponding to the set of scaled reference images $(I'_p)$ are generated by scaling the set of scaled reference images $(I'_p)$ l times and shifting the set of product images $(I_d)$ associated with each row of the image $(I_s)$, t times. At 508, the system 200 generates, by the one or more hardware processors, the one or more probable product images for each column from the set of columns corresponding to each row of the image $(I_s)$ based on the comparison between each rescaled product image from the set of rescaled product images $(I'_d)$ and each scaled reference images from the set of scaled reference images $(I'_p)$. Here, the set of normalized cross-correlation scores are generated for each comparison between each rescaled product image from the set of rescaled product images $(I'_d)$ and each scaled reference images from the set of scaled reference images $(I'_p)$. Further, the set of summed cross-correlation scores corresponding to each rescaled product image from the set of rescaled product images $(I'_d)$ are calculated by adding the set of normalized cross-correlation scores associated with each of the comparison. Further, the set of optimal cross-correlation scores are calculated by reordering the set of summed cross-correlation scores corresponding to each rescaled product image among the set of rescaled product images $(I'_d)$ to obtain a reordered list and selecting one or more summed cross-correlation scores from the reordered list. Further, the one or more probable product images are obtained for each column, corresponding to each optimal cross-correlation score associated with the column, based on the one or more summed cross-correlation scores from the reordered list. At 510, the system 200 calculate, by the one or more hardware processors, one or more composite scores $(C_s)$ for the one or more probable product images based on the set of optimized cross-correlation scores and a set of matching scores. Here, a set of matching scores between the one or more probable product images and the set of scaled reference images $(I'_p)$ are calculated. Further, the one or more composite scores $(C_s)$ for the one or more probable product images using the set of optimized cross-correlation scores and the set of matching scores are calculated. At 512, the system 200 construct, by the one or more hardware processors, the Directed Acyclic Graph (DAG) based on the one or more Composite score $(C_s)$ and the one or more probable product images. Here, the set of nodes are generated by representing each probable product image from the one or more probable product images corresponding to each column associated with each row of the image $(I_s)$, wherein the set of nodes includes the source node and the sink node. Further, the first set of edges are generated between the source node and each node from the set of nodes. Further, the second set of edges are generated between each node from the set of nodes and the sink node. Further, the third set of edges are generated between each node from the set of nodes associated with a first column and each node among the set of column nodes associated with a second column based on at least one of, a distance between a location associated with the first column and a location associated with the second column is greater than a width of the probable product associated with the node from the set of nodes associated with the first column; and a distance between a location associated with the first column and a location associated with the second column is equal to the width of the probable product associated with the node from the set of nodes associated with the first column. At 514, the system 200 identify, by the one or more hardware processors, the matching product image for the planogram compliance from the one or more probable product images in each column, based on the DAG.

Figure 6:
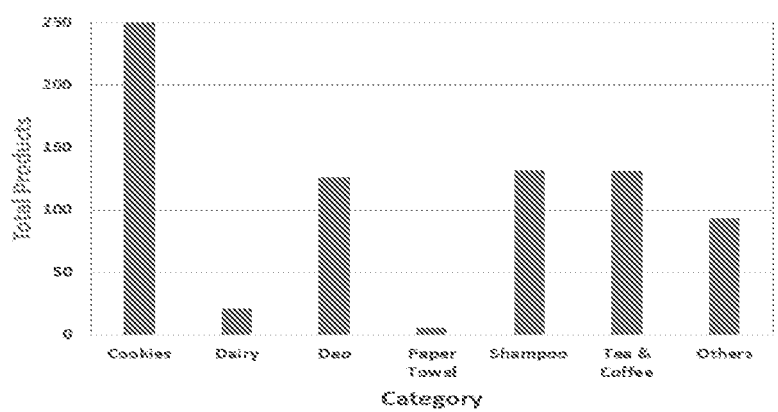
FIG. 6 depicts a category wise distributions of products available in $I_p$, according to some embodiments of the present disclosure.
Figure 7:
FIG. 7 depicts an example reconstructed image of FIG. 3B, according to some embodiments of the present disclosure.

In an embodiment, the system 200 is experimented as follows: The experiment is conducted with an exhaustive dataset including $I_p$ images of 750 products. More than 2000 images of shelves are collected both from stores and lab settings. FIG. 6 depicts a category wise distributions of products available in $I_p$, in accordance to some embodiments of the present disclosure. Further, FIG. 7 depicts an example reconstructed image of FIG. 3B, in accordance to some embodiments of the present disclosure.

Figure 8A:
FIG. 8A depicts an example reconstructed shelf image, according to some embodiments of the present disclosure.

In another embodiment, FIG. 8A depicts an example reconstructed shelf image, in accordance to some embodiments of the present disclosure. Now referring to FIG. 8A, the upper row is the original shelf image and the bottom row is the reconstructed shelf image. Here, the correct products are identified in spite of variation in illumination. Additionally, even minor variations in the product labeling are recognized by the present disclosure.

Figure 8B:
FIG. 8B depicts an example reconstructed shelf image where different product images having identical texture on a packaging cover are identified, according to some embodiments of the present disclosure.
Figure 8B:
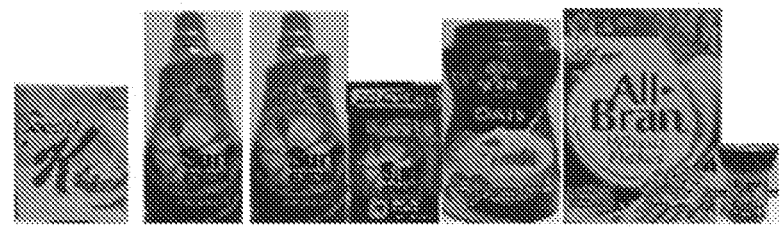
Figure 8C:
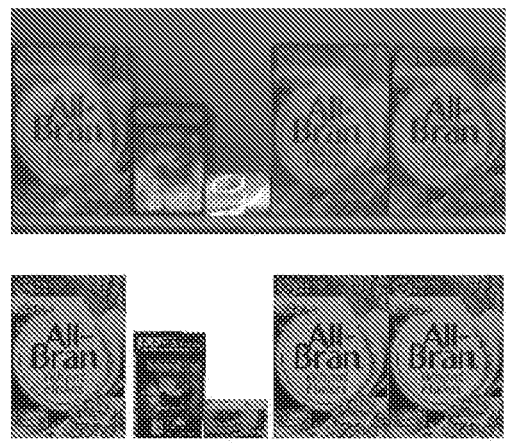
FIG. 8C depicts an example reconstructed image in presence of specular reflection, according to some embodiments of the present disclosure.

In an embodiment, FIG. 8B depicts an example reconstructed shelf image where different product images having identical texture on the packaging are identified, in accordance to some embodiments of the present disclosure. For example, a Surf Excel® bottle and a Surf Excel® pouch with same texture are reconstructed. Further, FIG. 8C depicts an example reconstructed image in spite of specular reflection, in accordance to some embodiments of the present disclosure.

Figure 8D:
FIG. 8D depicts an example reconstructed image by utilizing a maximum cross-correlation score and by utilizing the present disclosure, according to some embodiments of the present disclosure.
Figure 8E:
FIG. 8E depicts an example reconstructed image by utilizing a Neo Speeded Up Robust Features (NSURF) score and by utilizing the method of the present disclosure, according to some embodiments of the present disclosure.

In an embodiment, FIG. 8D depicts an example reconstructed image by utilizing the maximum cross-correlation score and by utilizing the present disclosure, in accordance to some embodiments of the present disclosure. Now referring to FIG. 8D, the first row indicates the input image $I_s$, the second row indicates the image reconstruction obtained by utilizing the maximum cross-correlation and the third row indicates the image construction obtained by utilizing the method specified in the present disclosure. Further, FIG. 8E depicts an example reconstructed image by utilizing the NSURF score and by utilizing the method of the present disclosure, in accordance to some embodiments of the present disclosure. Now referring to FIG. 8E, the first row indicates the input image $I_s$, the second row indicates the image reconstruction obtained by utilizing the NSURF score and the third row indicates the image construction obtained by utilizing the method specified in the present disclosure. Here, the present disclosure is able to identify a similar product with similar color and the NSURF score based method identified a similar product with different color.

Figure 9A:
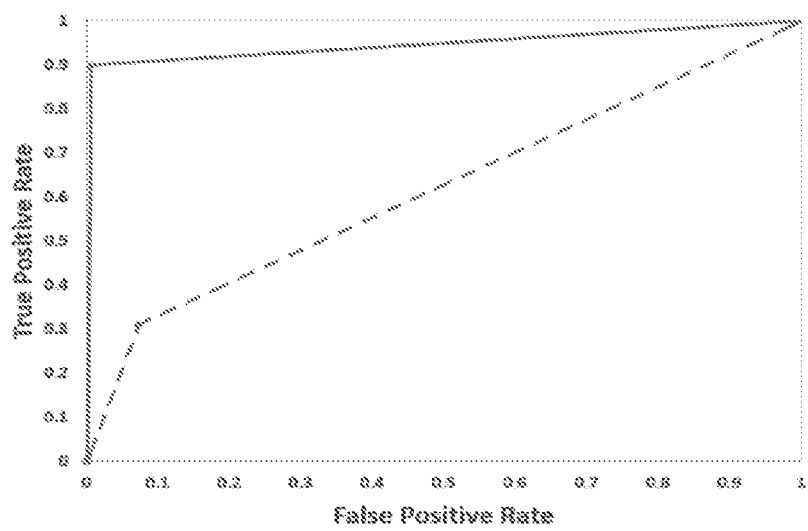
FIG. 9A depicts an example ROC (Receiver Operating Characteristic) curve plotted for true positive rate versus false positive rate for the system and method for object recognition based estimation of planogram compliance, according to some embodiments of the present disclosure.

In an embodiment, a quantitative analysis of the present disclosure is as given below: For 'N' product images in the product image database and for 'm' products available in a given shelf, wherein m<<N, the recognition and localization is performed. If a product is identified at column i of the shelf image $I_s$ and the algorithm predicts the product at a location i±δ, the product is correctly identified. Here, for example, the shift δ is typically considered as 75 mm for approximately 1000 mm wide shelf. Further, a True Positive (TP), a False Positive (FP), a True Negative (TN) and a False Negative (FN) are defined as follows for each of the m products available in the shelf. If product A is present at column i and the method 900 predicts A at column ±δ, the TP of the product A is assigned as 1. If a product other than A is present at column i and the method 900 predicts A at column i±δ, the FP of product A is assigned as 1. If a product other than A is present at column i and the algorithm does not predict A at column i±δ, the TN of product A is assigned as 1. If product A is present at column i and the method 900 predicts a product other than A at column i±δ, the FN of product A is assigned as 1. Further, FIG. 9A depicts an example ROC (Receiver Operating Characteristic) curve plotted for a true positive rate versus a false positive rate for the system and method for planogram compliance, in accordance to some embodiments of the present disclosure. Now referring to FIG. 9A, the dotted line indicates ROC curve for an existing histogram matching and the solid line indicates the ROC curve for the present disclosure. Here, the true positive rate is obtained from the equation 5 and the false positive rate is obtained from the equation 6 and the area under ROC for the proposed approach is significantly better compared to the conventional approaches.

$$\frac{TP}{(TP+FN)} \quad (6)$$

$$\frac{FP}{(FP+TN)} \quad (7)$$

Figure 9B:
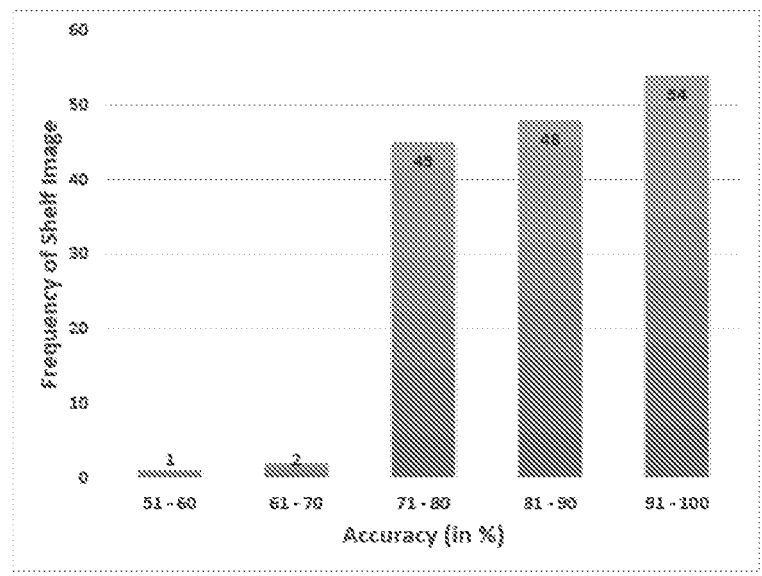
FIG. 9B depicts an example histogram for frequency associated with the example input image $I_s$ versus accuracy in image reconstruction for the system and method for object recognition based estimation of planogram compliance, according to some embodiments of the present disclosure.

In an embodiment, FIG. 9B depicts an example histogram for frequency of product images associated with the example input image $I_s$ versus accuracy in image reconstruction for the system and method for planogram compliance, in accordance to some embodiments of the present disclosure. Now referring to FIG. 9B, an accuracy value is the number of matches between the products of reconstructed result by utilizing the system 200 and the products in the ground truth divided by the total number of products present in the rack. Here, the histogram is plotted for 150 images associated with an example shelf image $I_s$, each rack includes four to five shelves displaying different products.

Figure 9C:
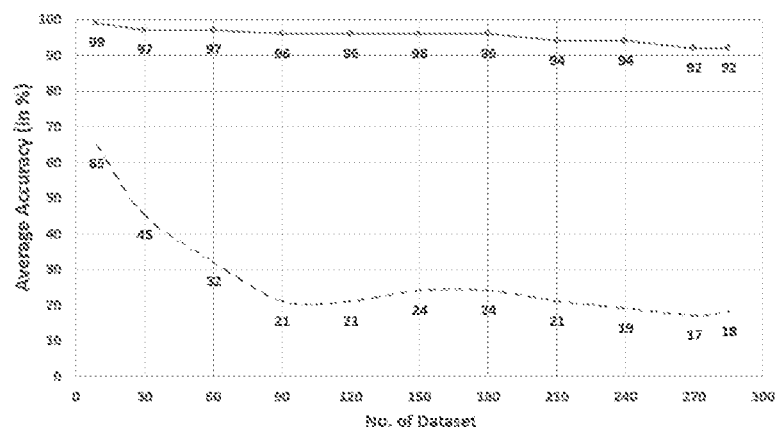
FIG. 9C depicts an example graph indicating relationship between increase in number of product images in the product image database and the accuracy of product identification for system and method for object recognition based estimation of planogram compliance, according to some embodiments of the present disclosure.

In another embodiment, the system 200 is tested with 500 shelf images of Cookies category. Here, each rack of the example shelf image $I_s$ taken after varying camera angle within ±15° and at different camera-to-rack distances. There are 9 unique products in these rack images. Therefore, the product image dataset initially contains 9 product images. The accuracy of detection of product images in each rack images are calculated by utilizing the method 900 and the existing histogram matching method. For calculating accuracy, all the product images present in the rack are identified correctly by utilizing the method 900 and the existing histogram matching method are divided by the total number of products available in the racks. The accuracy result averaged for 500 shelf images is reported as accuracy of product identification of said category. Further, the experimentation is repeated by increasing the product dataset size from 9 to 285 in steps of 30. This experiment tests whether the system 200 is scalable to additional 30 product images for each subsequent test. Here, the additional 30 products are not available in the 10 rack images under inspection. FIG. 9C depicts an example graph indicating the relationship between increase in number of product images in the product image database and the accuracy of product identification for the system and method for planogram compliance, in accordance to some embodiments of the present disclosure. Now, referring to FIG. 8C, the result clearly indicates that the system 200 is scalable.

In another embodiment, the system 200 is tested by utilizing a plurality of product image databases and the accuracy is compared with the accuracy of the conventional methods. For example, the system 200 provides an accuracy of 92.4% when tested with "Inhouse" product image database, 90.8% when tested with "Webmarket" product image database and 88.51% when tested with "Grocery" product image database. In comparison, it is identified that the accuracy of the system 200 is higher than the conventional systems for planogram compliance.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed methods and system for planogram compliance are able to provide an end-to-end solution for estimating products available on the shelf using computer vision based technology. Further, the composite score and DAG based image localization increased the accuracy of the system 200. Here, no prior information is utilized to preempt the type of products expected at a particular location. Further, the set of columns associated with the shelf are processed simultaneously to increase the computation speed.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method for object recognition based estimation of planogram compliance, the method comprising:
    receiving, by one or more hardware processors, an image ($I_s$) including a set of rows and a set of columns, associated with a shelf;
    generating, by the one or more hardware processors, a set of scaled reference images ($I'_p$), by converting pixel dimension of a set of reference images ($I_p$) to the scale of the image ($I_s$);
    preprocessing the image ($I_s$), by the one or more hardware processors, to determine a set of rescaled product images ($I'_d$) corresponding to the set of scaled reference images ($I'_p$);
    generating, by the one or more hardware processors, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$);
    calculating, by the one or more hardware processors, one or more composite scores ($C_s$) for the one or more probable product images based on a set of optimized cross-correlation scores and a set of matching scores;
    constructing, by the one or more hardware processors, a Directed Acyclic Graph (DAG) based on the one or more Composite score ($C_s$) and the one or more probable product images; and
    Identifying, by the one or more hardware processors, a matching product image for the planogram compliance from the one or more probable product images in each column, based on the DAG.

2. The method as claimed in claim 1, wherein the step of determining the set of rescaled product images ($I'_d$) corresponding to the set of scaled reference images ($I'_p$) by preprocessing the image ($I_s$) further comprises:
    cropping, a set of product images ($I_d$) from each column from the set of columns associated with each row of the image ($I_s$);
    generating the set of rescaled product images ($I'_d$) corresponding to the set of scaled reference images ($I'_p$) by:
    scaling the set of scaled reference images ($I'_p$), l times; and
    shifting the set of product images ($I_d$) associated with each row of the image ($I_s$), t times.

3. The method as claimed in claim 1, wherein the step of generating one or more probable product image for each column from the set of columns corresponding to each row of the image ($I_s$) by the comparison further comprises:

calculating a set of normalized cross-correlation scores for each comparison between each rescaled product image from the set of rescaled product images ($I'_d$) and each scaled reference images from the set of scaled reference images ($I'_p$);

calculating, a set of summed cross-correlation scores corresponding to each rescaled product image from the set of rescaled product images ($I'_d$) by adding the set of normalized cross-correlation scores associated with each of the comparison;

calculating, a set of optimal cross-correlation scores by reordering the set of summed cross-correlation scores corresponding to each rescaled product image among the set of rescaled product images ($I'_d$) to obtain a reordered list and selecting one or more summed cross-correlation scores from the reordered list; and obtaining, based on the one or more summed cross-correlation scores from the reordered list, the one or more probable product images for each column, corresponding to each optimal cross-correlation score associated with the column.

4. The method as claimed in claim 1, wherein calculating the one or more composite scores for the one or more probable product images further comprises:

calculating a set of matching scores between the one or more probable product images and the set of scaled reference images ($I'_p$); and calculating the one or more composite scores ($C_s$) for the one or more probable product images using the set of optimized cross-correlation scores and the set of matching scores.

5. The method as claimed in claim 1, wherein constructing the Directed Acyclic Graph (DAG) based on the one or more Composite score ($C_s$) and the one or more probable product images further comprises:

generating a set of nodes by representing each probable product image from the one or more probable product images corresponding to each column associated with each row of the image ($I_s$) as a node, wherein the set of nodes includes a source node and a sink node;

generating a first set of edges between the source node and each node from the set of nodes;

generating a second set of edges between each node from the set of nodes and the sink node;

generating a third set of edges between each node from the set of nodes associated with a first column and each node among the set of column nodes associated with a second column based on at least one of, a distance between a location associated with the first column and a location associated with the second column is greater than a width of the probable product associated with the node from the set of nodes associated with the first column; and a distance between a location associated with the first column and a location associated with the second column is equal to the width of the probable product associated with the node from the set of nodes associated with the first column.

6. The method as claimed in claim 5, wherein each probable product from the set of probable products associated with a node among the set of nodes is associated with a width.

7. The method as claimed in claim 5, wherein the first set of edges, the second set of edges and the third set of edges of the DAG are associated with a weight.

8. An object recognition based estimation of planogram compliance system, the system comprising:

one or more memories comprising programmed instructions and a repository for storing the set of reference images ($I_p$) and the set of scaled reference images ($I'_p$);

one or more hardware processors operatively coupled to the one or more memories, wherein the one or more hardware processors are capable of executing the programmed instructions stored in the one or more memories;

an image capturing device and an image analysis unit, wherein the image analysis unit is configured to:

receive, an image ($I_s$) including a set of rows and a set of columns, associated with a shelf;

generate, a set of scaled reference images ($I'_p$), by converting pixel dimension of a set of reference images ($I_p$) to the scale of the image ($I_s$);

preprocess, the image ($I_s$) to determine a set of rescaled product images ($I'_d$) corresponding to the set of scaled reference images ($I'_p$);

generate, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$);

calculate, one or more composite scores ($C_s$) for the one or more probable product images based on a set of optimized cross-correlation scores and a set of matching scores;

construct, a Directed Acyclic Graph (DAG) based on the one or more Composite score ($C_s$) and the one or more probable product images; and identify, a matching product image for the planogram compliance from the one or more probable product images in each column, based on the DAG.

9. The system as claimed in claim 8, wherein the image analysis unit is configured to preprocess the image ($I_s$) for determining the set of rescaled product images ($I'_d$) corresponding to the set of scaled reference images ($I'_p$) by:

cropping, a set of product images ($I_d$) from each column from the set of columns associated with each row of the image ($I_s$); and generating the set of rescaled product images ($I'_d$) corresponding to the set of scaled reference images ($I'_p$) by:

scaling the set of scaled reference images ($I'_p$), l times; and shifting the set of product images ($I_d$) associated with each row of the image ($I_s$), t times.

10. The system as claimed in claim 8, wherein the image analysis unit is configured to compare each product image and each scaled reference images for generating the one or more probable product image for each column from the set of columns corresponding to each row of the image ($I_s$) by:

calculating a set of normalized cross-correlation score for each comparison between each rescaled product image from the set of rescaled product images ($I'_d$) and each scaled reference images from the set of scaled reference images ($I'_p$);

calculating, a set of summed cross-correlation scores corresponding to each rescaled product image from the set of rescaled product images ($I'_d$) by adding the set of normalized cross-correlation scores associated with each of the comparison;

calculating, a set of optimal cross-correlation scores by reordering the set of summed cross-correlation scores corresponding to each rescaled product image among the set of rescaled product images ($I'_d$) to obtain a reordered list and selecting one or more summed cross-correlation scores from the reordered list; and obtaining, based on the one or more summed cross-correlation scores from the reordered list, the one or more probable product images for each column, corresponding to each optimal cross-correlation score associated with the column.

11. The system as claimed in claim 8 wherein the image analysis unit is configured to calculate the one or more composite scores for the one or more probable product images by:

calculating a set of matching scores between the one or more probable product images and the set of scaled reference images ($I'_p$); and calculating the one or more composite scores ($C_s$) for the one or more probable product images using the set of optimal cross-correlation scores and the set of matching scores.

12. The system as claimed in claim 8, wherein the image analysis unit is configured to construct the Directed Acyclic Graph (DAG) based on the one or more Composite score ($C_s$) and the one or more probable product images by:

generating a set of nodes by representing each probable product image from the one or more probable product images corresponding to each column associated with each row of the image ($I_s$) as a node, wherein the set of nodes includes a source node and a sink node;

generating a first set of edges between the source node and each node from the set of nodes;

generating a second set of edges between each node from the set of nodes and the sink node; and generating a third set of edges between each node from the set of nodes associated with a first column and each node among the set of column nodes associated with a second column based on at least one of, a distance between a location associated with the first column and a location associated with the second column is greater than a width of a probable product associated with the node from the set of nodes associated with the first column; and a distance between a location associated with the first column and a location associated with the second column is equal to the width of the probable product associated with the node from the set of nodes associated with the first column.

13. The system as claimed in claim 12, wherein each probable product from the one or more probable products associated with a node from the set of nodes is associated with a width.

14. The system as claimed in claim 12, wherein the first set of edges, the second set of edges and the third set of edges of the DAG are associated with a weight.

15. A computer program product comprising a non-transitory computer-readable medium having embodied therein a computer program for system and method for object recognition based estimation of planogram compliance:

receiving, by one or more hardware processors, an image ($I_s$) including a set of rows and a set of columns, associated with a shelf;

generating, by the one or more hardware processors, a set of scaled reference images ($I'_p$) by converting pixel dimension of a set of reference images ($I_p$) to the scale of the image ($I_s$);

preprocessing the image ($I_s$), by the one or more hardware processors, to determine a set of rescaled product images ($I'_d$) corresponding to the set of scaled reference images ($I'_p$);

generating, by the one or more hardware processors, one or more probable product images for each column from the set of columns corresponding to each row of the image ($I_s$) based on a comparison between each rescaled product image from the set of rescaled product images ($I'_d$) and each scaled reference images from the set of scaled reference images ($I'_p$);

calculating, by the one or more hardware processors, one or more composite scores ($C_s$) for the one or more probable product images based on a set of optimized cross-correlation scores and a set of matching scores;

constructing, by the one or more hardware processors, a Directed Acyclic Graph (DAG) based on the one or more Composite score ($C_s$) and the one or more probable product images; and identifying, by the one or more hardware processors, a matching product image for the planogram compliance from the one or more probable product images in each column, based on the DAG.

* * * * *